June 1, 1937. C. A. SABBAH Re. 20,391

ELECTRIC VALVE CONVERTING SYSTEM

Original Filed May 5, 1933

Inventor:
Camil A. Sabbah,
by Charles E. Mullen
His Attorney.

Reissued June 1, 1937 Re. 20,391

UNITED STATES PATENT OFFICE 20,391

ELECTRIC VALVE CONVERTING SYSTEM

Camil A. Sabbah, deceased, late of Schenectady, N. Y., by General Electric Co., Schenectady, N. Y., assignee, a corporation of New York Original No. 1,961,080, dated May 29, 1934, Serial No. 669,553, May 5, 1933. Application for reissue May 23, 1936, Serial No. 81,547

17 Claims. (Cl. 171—97)

This invention relates to electric valve converting systems and more particularly to such systems suitable for transmitting energy between direct current circuits of different voltages.

Heretofore, there have been proposed numerous electric valve converting systems for transmitting energy between direct and alternating current circuits, independent alternating current circuits of the same or different frequencies, or direct current circuits of different voltages. Apparatus of this latter type have, in general, comprised separate inverting apparatus and rectifying apparatus coupled through a common alternating current circuit. In such an apparatus, the energy passing from one direct current circuit to the other, flows through two independent groups of valves so that the kv-a. rating of the equipment as a whole is substantially greater than the kv-a. transmitted between the two direct current circuits.

It is an object of the invention to provide a new and improved electric valve converting system for transmitting energy between two direct current circuits of different voltages which will overcome the above-mentioned disadvantages of the arrangements of the prior art, and which will be simple and reliable in operation.

It is another object of the invention to provide an improved electric valve converting system for transmitting energy between direct current circuits of different voltages in which the kv-a. rating of the equipment as a whole will not substantially exceed the kv-a. of the energy transmitted between the circuits.

Figure 1:
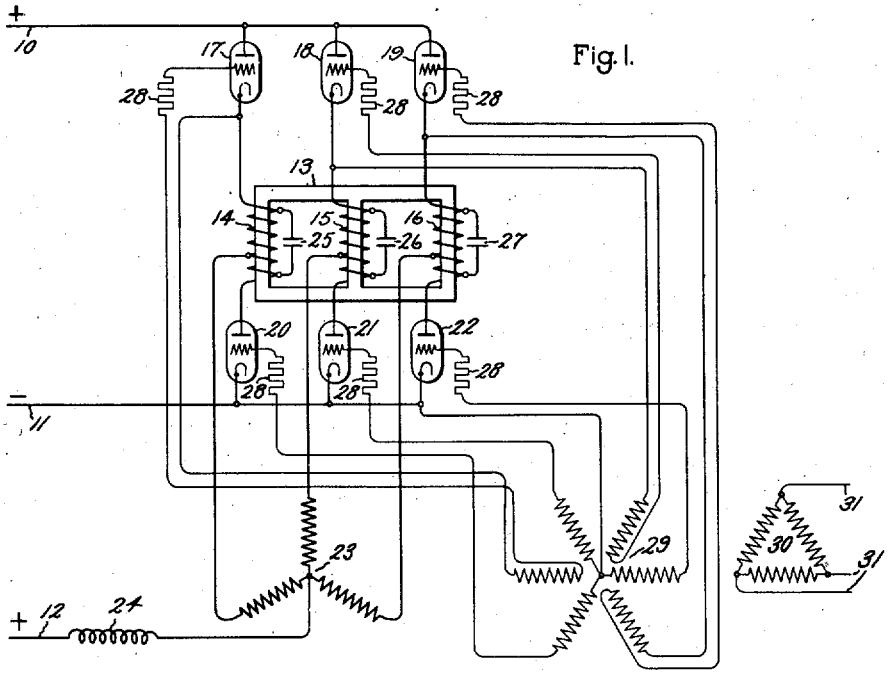
Figure 2:
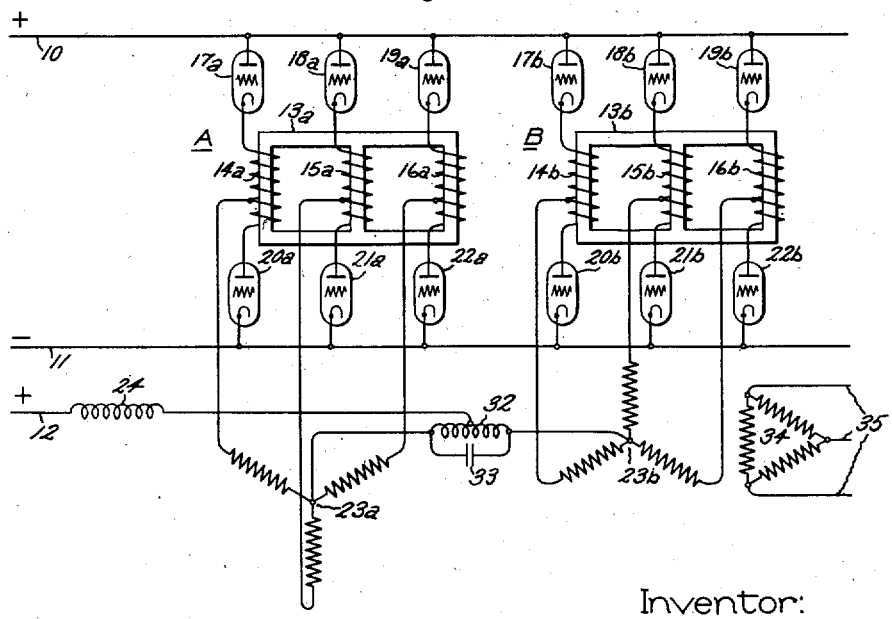

In accordance with one form of the invention illustrated in Fig. 2, an electric valve converting apparatus of the type disclosed in United States Letters Patent No. 1,907,589 granted May 9, 1933 is used. That patent discloses a valve converting apparatus for transmitting energy between direct and alternating current circuits and comprising a multi-legged reactor, the several branches of which carry inductive windings, corresponding terminals being connected to one side of the direct current circuit through one group of valves and to the other side of the direct current circuit through a second group of valves. The alternating current circuit is connected to the electrical midpoints of the several inductive windings. In the present invention, illustrated in Figs. 1 and 2, intermediate terminals of the several inductive windings of the reactor are connected directly together or to the phase terminals of a polyphase alternating current network. The common connection of the intermediate terminals or the neutral point of the inductive network forms one terminal of the low voltage direct current circuit while the other terminal of the low voltage circuit is common with one terminal of the high voltage circuit. It is to be understood that the terms "low voltage" and "high voltage" do not imply any absolute values but only the relative values of the voltages of the two direct current circuits. The system thus in effect becomes a direct current autotransformer in which the full windings of the reactor device comprise the high voltage windings and the portions included between the alternating current terminals and the common terminal of the low voltage direct current circuit comprise the secondary windings, or vice versa.

For a better understanding of the invention, together with other and further objects thereof, reference is had to the following description taken in connection with the accompanying drawing and its scope will be pointed out in the appended claims. In the drawing Fig. 1 illustrates a converting system embodying the invention for transmitting energy between two direct current circuits of different voltages, while Fig. 2 shows a modified form of the invention which is suitable for supplying in addition an alternating current load circuit.

Referring now more particularly to Fig. 1 of the drawing, there is illustrated an arrangement embodying my invention for transferring energy between a relatively high voltage direct current circuit 10—11 and a relatively low voltage direct current circuit 11—12, having a common terminal 11. This system includes an electric valve converting apparatus comprising a reactance device 13 having a three-legged magnetic core member, the several branches of which carry inductive windings 14, 15 and 16. Corresponding terminals of the windings 14, 15 and 16 are connected to the direct current terminal 10 through a group of electric valves 17, 18 and 19, while the other terminals of these windings are connected to the direct current terminal 11 through a group of valves 20, 21 and 22, respectively. Each of the several electric valves 17—22, inc., is provided with an anode, a cathode and a control grid, and may be of any of the several types well known in the art, although it is preferred to use valves of the gaseous or vapor electric discharge type. Each of the windings 14, 15 and 16 is provided with an intermediate terminal, these terminals dividing the several windings into portions having the same turn ratio. The intermediate terminals of the windings 14, 15 and 16 are connected to the several phase terminals of a three phase Y-connected inductive network 23, the electrical neutral of which is connected to the direct current terminal 12 through a smoothing reactor 24. However in certain cases the inductive network 23 may be omitted and the intermediate terminals of the windings 14, 15 and 16 connected together to form one terminal 12 of the direct current circuit.

In case the electric valves 17—22, inc., are of the gaseous or vapor electric discharge type, the current cannot be commutated between them, under certain operating conditions, by the grid circuits alone, and it is necessary to connect the capacitors 25, 26 and 27 in circuit with the windings 14, 15 and 16, respectively, either across the full windings, as illustrated, or across portions thereof. In order to render the several electric valves 17—22, inc., conductive in the proper sequence, their grids are connected to their respective cathodes through current limiting resistors 28 and appropriate phase windings of the secondary network 29 of a grid transformer, the primary network 30 of which is connected to an alternating current circuit 31 of any suitable frequency.

The general principles of operation of the above described converting apparatus per se will be well understood by those skilled in the art. However, in accordance with the invention as illustrated in Fig. 1, it will be apparent that the phase relation between the grid excitation of the valves 17, 18, 19 and valves 20, 21, 22, energized through the phase windings 29 and 30 is such that the valves in the lower group become conductive in advance of the corresponding valves of the upper group. While the arrangement shown in Fig. 1 provides a phase angle of 120° between the time that the lower valves become conductive and the time that the corresponding upper valves become conductive other angles just greater than 0° and slightly less than 180° may be employed.

In brief, neglecting the leakage reactance of the device 13, the several windings 14, 15 and 16 serve to maintain the total magnetomotive force and that of each of the arms of the magnetic core structure 13 at a constant value. In order to satisfy this condition, and the condition that all currents flowing from one side of the direct current circuit must equal those flowing to the other side (neglecting the auxiliary direct current circuit 11—12) it has been demonstrated both analytically and experimentally that each of the several electric valves is conductive for 120 electrical degrees of each cycle, the valves becoming conductive in a predetermined sequence at a frequency equal to that of the alternating current circuit 31, from which the grids of the several electric valves are controlled. In case the inductive network 23 is not connected to an independent source of electromotive force, the leakage reactance of the reactance device 13 and the inductive network 23 will tend to cause the current in the system to be slightly lagging with respect to the alternating electromotive force of the network 23.

In operation the electromotive forces of the windings are in the proper direction to assist commutation and effect a transfer of load current between the valves. This may be accomplished, as is well understood by those skilled in the art, by connecting the capacitors 25, 26 and 27 across the windings 14, 15 and 16, respectively.

The function performed in the operation of the system by the three-legged core structure 13, the windings 14, 15, 16 and the associated capacitors 25, 26 and 27 perhaps will be clarified by the following example of one cycle of operation of the valves associated with one leg of the core structure. In the arrangement shown, the grid excitation supplied to the valves 17 and 20 is such that the valve 20 is conductive for 120° but meanwhile the valve 17 is nonconductive. In order to supply energy to the valve 20, the capacitor 25, having been charged to a certain potential by previous operation, now discharges into the winding 14 so as to supply current to the anode of the valve 20. At the end of the conductivity of the valve 20, the valve 17 becomes conductive and the valve 20 now is nonconductive. Thus the current transmitted by the valve 17 serves to store energy in the capacitor 25 during the period of conductivity of this valve. At the end of the period of conductivity of the valve 17, the current is transferred from this valve to the valve 18 and during the conductivity of the valve 18, the valves 17 and 20 both remain nonconductive. During the period when neither of the valves 17 and 20 is conductive, the capacitor 25 discharges into the transformer winding in order to maintain the required magnetomotive force on this transformer winding, and in doing so it reverses its polarity so that it has the proper polarity to supply power to the anode of valve 20 when it is again permitted to become conductive. From this it is believed that it will be apparent to those skilled in the art that the capacitors 25, 26 and 27 not only provide commutating potentials to cause the transfer of current between the valves 17, 18 and 19, but also operate as energy storage devices to supply current to the anodes of the valves 20, 21 and 22.

An alternating electromotive force may be drawn from the intermediate terminals of the windings 14, 15 and 16. In addition, however, it has been shown both experimentally and analytically that a unidirectional component of voltage exists between the electrical neutral of the network 23 and the terminals 10 and 11 and that the magnitude of this unidirectional voltage bears a relation to the voltage of the direct current circuit 10—11 dependent on the number of turns of the lower portions of the windings 14, 15 and 16 to that of the whole windings. An alternating electromotive force also exists in the windings of the inductive network 23 and this electromotive force may be utilized in an independent alternating current circuit, if desired. This alternating component may be suppressed from the low voltage direct current circuit 11—12 by means of the series reactor 24 or any other suitable filter circuit. In case the network 23 is omitted, the operation of the remainder of the system is substantially the same, the alternating components of voltage appearing across the inductive windings 14, 15, and 16 and the reactor 24. Thus, in effect, the above-described apparatus comprises a direct current autotransformer, by means of which energy may be transmitted between a relatively high voltage direct current circuit and a relatively low voltage direct current circuit, either of which may be the supply circuit. The power transfer between the circuits may be varied by varying the phase relation of potentials applied to the grids of the valves 17, 18 and 19 with respect to those applied to the valves 20, 21 and 22 in any well known manner. This system operates to transfer power from the constant potential direct current input circuit to the direct current output circuit which has a constant current characteristic.

The above-described apparatus constitutes a simple three phase converting apparatus. In the arrangement of Fig. 2 is shown a double three phase converting apparatus by means of which certain economy in the capacitors may be secured. In this figure, two converting apparatus A and B, each similar to the converting apparatus of Fig. 1 and each having its corresponding elements similarly numbered with the subscripts *a* and *b* to identify the converting apparatus of which it is a part, are combined to form a double three phase converting system. With such an arrangement, the electrical neutrals of the networks 23a and 23b are interconnected through an interphase transformer 32, the electrical midpoint of which is connected to the direct current terminal 12 through the current smoothing reactor 24. In this arrangement, a single commutating capacitor 33 may be connected across the interphase transformer 32 to provide the necessary commutating electromotive force. In this arrangement, the capacitor 33 operates at a third harmonic frequency which enables a considerable reduction in its size and cost. In the system of Fig. 2 also, the networks 23a and 23b are illustrated as comprising primary networks of an output transformer, the secondary network 34 of which is connected to an alternating current load circuit 35. In this manner, energy may be supplied from a high voltage direct current circuit to a low voltage direct current, or vice versa, and at the same time energy may be supplied to an alternating current circuit from the same apparatus.

While the preferred embodiments of the invention, as at present considered, have been described, it will be obvious to those skilled in the art that various changes and modifications may be made without departing from the invention, and we therefore aim in the appended claims to cover all such changes and modifications as fall within the true spirit and scope of the invention.

What we claim as new and desire to secure by Letters Patent of the United States is:

1. An electric valve converting system comprising a relatively high voltage direct current circuit, a relatively low voltage direct current circuit, said circuits having a common terminal, an electric valve converting apparatus connected across said high voltage circuit and including a plurality of inductive windings provided with intermediate terminals, said intermediate terminals being interconnected to form the other terminal of said low voltage circuit.

2. An electric valve converting system comprising a relatively high voltage direct current circuit, a relatively low voltage direct current circuit, said circuits having a common terminal, an electric valve converting apparatus connected across said high voltage circuit and including a plurality of inductive windings provided with intermediate terminals, and an inductive network interconnecting said intermediate terminals and provided with an electrical neutral forming the other terminal of said low voltage circuit.

3. An electric valve converting system comprising a relatively high voltage direct current circuit, a relatively low voltage direct current circuit, said circuits having a common terminal, a plurality of pairs of electric valves, a reactance device provided with a plurality of windings, said valves and windings being connected to form a plurality of paths across said high voltage circuit, each including one of said windings and one of said pairs of valves, a connection between intermediate terminals of said windings, forming the other terminal of said low voltage circuit, and means for rendering said valves conductive in a predetermined sequence.

4. An electric valve converting system comprising a relatively high voltage direct current circuit, a relatively low voltage direct current circuit, said circuits having a common terminal, a polyphase reactance device comprising an *n*-legged core structure having a winding on each leg, a pair of groups of electric valves, each connecting corresponding terminals of said windings to one side of said high voltage circuit, each of said windings being provided with an intermediate terminal, a plurality of other windings connected to form an *n*-phase winding system interconnecting said intermediate terminals and provided with an electrical neutral forming the other terminal of said low voltage circuit, and means for rendering said valves conductive in a predetermined sequence.

5. An electric valve converting system comprising a relatively high voltage direct current circuit, a relatively low voltage direct current circuit, said circuits having a common terminal, a polyphase reactance device comprising an *n*-legged core structure having a winding on each leg, a pair of groups of electric valves, each connecting corresponding terminals of said windings to one side of said high voltage circuit, each of said windings being provided with an intermediate terminal, a commutating capacitor connected in circuit with each of said windings, a connection between said intermediate terminals forming the other terminal, of said low voltage circuit, and means for rendering said valves conductive in a predetermined sequence.

6. An electric valve converting system comprising a relatively high voltage direct current circuit, a relatively low voltage direct current circuit, said circuits having a common terminal, a polyphase reactance device comprising an *n*-legged core structure having a winding on each leg, a pair of groups of electric valves, each connecting corresponding terminals of said windings to one side of said high voltage circuit, each of said windings being provided with an intermediate terminal, a commutating capacitor connected in circuit with each of said windings, an *n*-phase inductive network interconnecting said intermediate terminals and provided with an electrical neutral forming the other terminal of said low voltage circuit, and means for rendering said valves conductive in a predetermined sequence.

7. An electric valve converting system comprising a relatively high voltage direct current circuit, a relatively low voltage direct current circuit, said circuits having a common terminal, an electric valve inverting apparatus connected across said high voltage circuit and including a plurality of inductive windings provided with intermediate terminals, a plurality of other inductive windings connected to form a winding system interconnecting said intermediate terminals, said winding system having an electrical neutral forming the other terminal of said low voltage circuit, and an alternating current load circuit including said winding system.

8. An electric valve converting system comprising a relatively high voltage direct current circuit, a relatively low voltage direct current circuit, said circuits having a common terminal, a polyphase reactance device comprising an *n*-legged core structure having a winding on each leg, a pair of groups of electric valves, each connecting corresponding terminals of said windings to one side of said high voltage circuit, each of said windings being provided with an intermediate terminal, a plurality of other windings connected to form an *n*-phase winding system interconnecting said intermediate terminals and provided with an electrical neutral forming the other terminal of said low voltage circuit, an alternating current load circuit energized from said winding system, and means for rendering said valves conductive in a predetermined sequence.

9. An electric valve converting system comprising a relatively high voltage direct current circuit, a relatively low voltage direct current circuit, said circuits having a common terminal, a pair of polyphase reactance devices each comprising an $n$-legged core structure having a winding on each leg, a pair of groups of electric valves, each connecting corresponding terminals of said windings to one side of said high voltage circuit, each of said windings being provided with an intermediate terminal, and $n$-phase inductive network interconnecting the intermediate terminals of the windings of each of said reactance devices and provided with an electrical neutral, an interphase inductive winding interconnecting said neutrals and itself provided with an electrical neutral forming the other terminal of said low voltage circuit, and means for rendering said valves conductive in a predetermined sequence.

10. An electric valve converting system comprising a relatively high voltage direct current circuit, a relatively low voltage direct current circuit, said circuits having a common terminal, a pair of polyphase reactance devices each comprising an $n$-legged core structure having a winding on each leg, a pair of groups of electric valves, each connecting corresponding terminals of said windings to one side of said high voltage circuit, each of said windings being provided with an intermediate terminal, an $n$-phase inductive network interconnecting the intermediate terminals of the windings of each of said reactance devices and provided with an electrical neutral, an interphase inductive winding interconnecting said neutrals and itself provided with an electrical neutral forming the other terminal of said low voltage circuit, a commutating capacitor connected across said interphase inductive winding, and means for rendering said valves conductive in a predetermined sequence.

11. An electric valve converting system comprising a direct current input circuit, a direct current output circuit, a polyphase reactance device comprising an $n$-legged core structure having at least one winding on each leg, a group of valves interconnecting said reactance device with said input circuit, a second group of valves interconnecting said reactance device with said output circuit, and means for controlling the conductivity of said valves.

12. An electric valve converting system comprising a direct current input circuit, a direct current output circuit, a polyphase reactance device comprising an $n$-legged core structure having at least one winding on each leg, a capacitor for each leg connected across at least a portion of said winding, a group of electric discharge valves interconnecting said reactance device with said input circuit, a second group of valves interconnecting said reactance device with said output circuit, and means for controlling the conductivity of said valves.

13. An electric valve converting system comprising direct current input and output circuits, one of said circuits having a constant potential characteristic and the other having a constant current characteristic, an energy storage and transfer device including a plurality of capacitors connected in parallel to a plurality of inductive windings, a plurality of electric valves interconnecting said circuits with said device, and means for controlling the conductivities of said valves.

14. An electric valve converting system comprising a constant potential direct current circuit, a constant current direct current circuit, a polyphase reactance device comprising an $n$-legged core structure having a winding on each leg, a group of electric discharge valves interconnecting said reactance device with said constant potential circuit, a capacitor for each leg of said reactance device and connected across that portion of the winding associated with said constant potential circuit, a second group of electric discharge valves interconnecting said reactance device with said constant current circuit, and means for controlling the conductivity of said valves.

15. An electric valve converting system for transmitting energy between two circuits, one of said circuits being a direct current circuit, a polyphase reactance device comprising an $n$-legged core structure having at least one winding on each leg, a capacitor for each leg being connected across at least a portion of said winding, a group of electric discharge valves interconnecting said reactance device with one of said circuits, a second group of electric discharge valves interconnecting said reactance device with the other of said circuits, and means for controlling the conductivity of said valves.

16. An electric valve converting system for transmitting energy from an input circuit to an output circuit, one of said circuits being a constant potential circuit, the other of said circuits being a constant current circuit, a group of electric valves connected to one of said circuits, a second group of valves connected to the other of said circuits, an energy storage and transfer device interconnecting said groups of valves, said device comprising an $n$-legged core structure having a winding on each leg and a capacitor for each winding, said capacitors each being connected in parallel with a portion of the respective windings, and means for controlling the conductivities of said valves.

17. An electric valve converting system for transmitting energy between a constant potential circuit and a constant current circuit comprising an energy storage and transfer device having an $n$-legged core structure provided with a capacitor and at least one inductive winding for each leg, said capacitors each being connected in parallel with a portion of its associated inductive winding, a group of controlled electric discharge valves connected between said energy transfer device and one of said circuits for controlling the flow of energy to be stored in said device, a second group of controlled electric discharge valves connected between said energy transfer device and said other circuit for controlling the flow of energy from said device, and means for controlling the conductivities of said valves.

GENERAL ELECTRIC COMPANY,
*Assignee of Camil A. Sabbah, Deceased,*
By CHARLES E. TULLAR,
*Vice President.*